United States Patent
Zhan et al.

(10) Patent No.: US 12,092,381 B2
(45) Date of Patent: Sep. 17, 2024

(54) ELECTRONIC EXPANSION VALVE AND ASSEMBLING METHOD OF ELECTRONIC EXPANSION VALVE

(71) Applicant: ZHEJIANG DUNAN ARTIFICIAL ENVIRONMENT CO., LTD., Zhejiang (CN)

(72) Inventors: Shaojun Zhan, Zhejiang (CN); Zhiqiang Di, Zhejiang (CN); Guigang Feng, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 283 days.

(21) Appl. No.: 17/763,725

(22) PCT Filed: Apr. 23, 2020

(86) PCT No.: PCT/CN2020/086494
§ 371 (c)(1),
(2) Date: Mar. 25, 2022

(87) PCT Pub. No.: WO2021/057019
PCT Pub. Date: Apr. 1, 2021

(65) Prior Publication Data
US 2022/0341638 A1    Oct. 27, 2022

(30) Foreign Application Priority Data

Sep. 27, 2019 (CN) .......................... 201910927066.8
Sep. 27, 2019 (CN) .......................... 201921636034.4
Sep. 27, 2019 (CN) .......................... 201921637697.8

(51) Int. Cl.
*F25B 41/35*      (2021.01)
*F16K 1/02*       (2006.01)
(Continued)

(52) U.S. Cl.
CPC ................ *F25B 41/35* (2021.01); *F16K 1/02* (2013.01); *F16K 1/36* (2013.01); *F16K 31/047* (2013.01)

(58) Field of Classification Search
CPC ........ F25B 41/35; F25B 2341/06; F16K 1/02; F16K 1/36; F16K 1/42; F16K 27/02; F16K 31/047
See application file for complete search history.

(56) References Cited

U.S. PATENT DOCUMENTS

2015/0048266 A1 * 2/2015 Shen ...................... F16K 31/04
251/69

FOREIGN PATENT DOCUMENTS

CN    102734476 A      10/2012
CN    107975629 A  *   5/2018  .............. F16B 37/00
(Continued)

OTHER PUBLICATIONS

Pdf is translation of foreign reference CN108375250A (Year: 2018).*
(Continued)

*Primary Examiner* — Henry T Crenshaw
*Assistant Examiner* — Kamran Tavakoldavani
(74) *Attorney, Agent, or Firm* — Samson G. Yu (57) ABSTRACT

Some embodiments of the present invention provide an electronic expansion valve and assembling method of electronic expansion valve, the electronic expansion valve includes: a housing; a guide sleeve; a screw; a rotor being drivingly connected with the screw; and a valve needle assembly movably disposed in the housing, one end of the screw being connected with the valve needle assembly so as to drive the valve needle assembly to move axially by means of the screw. A guide segment and a press-fit segment which are in communication with each other are disposed between an inner wall of the housing and an outer wall of the guide (Continued)

sleeve, a spacing between the guide sleeve and the housing located on the guide segment is greater than a spacing between the guide sleeve and the housing located on the press-fit segment.

20 Claims, 9 Drawing Sheets

(51) Int. Cl.
*F16K 1/36* (2006.01)
*F16K 31/04* (2006.01)

(56) References Cited

FOREIGN PATENT DOCUMENTS

| | | | | |
|---|---|---|---|---|
| CN | 108343749 | A | 7/2018 | |
| CN | 108375250 | A * | 8/2018 | ............ F25B 41/31 |
| CN | 108999990 | A | 12/2018 | |
| CN | 208281509 | U | 12/2018 | |
| CN | 208431390 | U | 1/2019 | |
| CN | 209012510 | U | 6/2019 | |
| CN | 209196130 | U | 8/2019 | |
| EP | 3789639 | A1 | 3/2021 | |
| KR | 20140054562 | A | 5/2014 | |
| WO | 2006064865 | A1 | 6/2006 | |

OTHER PUBLICATIONS

Pdf is translation of foreign reference CN-107975629-A (Year: 2018).*

The extended European search report of the corresponding EP patent application No. 20868592.5 mail date Sep. 26, 2023.

* cited by examiner

ELECTRONIC EXPANSION VALVE AND ASSEMBLING METHOD OF ELECTRONIC EXPANSION VALVE

CROSS-REFERENCE TO RELATED DISCLOSURE

The present disclosure is a national stage disclosure of International Patent Disclosure No. PCT/CN2020/086494, which is filed on Apr. 23, 2020, and claims priority to Chinese Patent Disclosure No. 201910927066.8, filed on Sep. 27, 2019, Chinese Patent Disclosure No. 20192163034.4, filed on Sep. 27, 2019, and Chinese Patent Disclosure No. 201921637697.8, filed on Sep. 27, 2019, and entitled "Electronic Expansion Valve", the contents of which are hereby incorporated by reference in its entirety.

TECHNICAL FIELD

This disclosure relates to a technical field of electronic expansion valves, and specifically relates to an electronic expansion valve and assembling method of electronic expansion valve.

BACKGROUND

At present, an electronic expansion valve includes a housing and a guide sleeve, and the guide sleeve is disposed in the housing, wherein the electronic expansion valve is respectively connected with a first pipe and a second pipe, and the communication condition of the first pipe and the second pipe can be controlled by the electronic expansion valve.

When assembling the electronic expansion valve with the first pipe and the second pipe, first, the first pipe and the second pipe are welded to the housing by means of furnace welding, and then, the guide sleeve is press-fitted into the housing. Since the structure known to inventors of the guide sleeve and the housing cannot meet the welding process requirements of furnace welding, the guide sleeve can only be fixed on the housing by means of laser welding, thereby completing an assembly process.

However, in the art known to inventors, after the first pipe and the second pipe are welded to the housing, when the guide sleeve is press-fitted into the housing, the first pipe and the second pipe will affect the press fitting of the guide sleeve; and during laser welding of the guide sleeve and the valve base, unilateral warping is easy to occur, so that it is difficult to ensure a coaxiality of the guide sleeve and the housing. Therefore, there is a problem of low coaxiality in the art known to inventors.

SUMMARY

Some embodiments of the present disclosure provide an electronic expansion valve and assembling method of electronic expansion valve to solve the problem of low coaxiality in the art known to inventors.

In order to solve the above problem, this disclosure provides an electronic expansion valve. The electronic expansion valve includes: a housing; a guide sleeve, disposed in the housing; a rotor rotatably, disposed in the housing; a screw, disposed in the housing, the rotor being drivingly connected with the screw; and a valve needle assembly, movably disposed in the housing, one end of the screw being connected with the valve needle assembly so as to drive the valve needle assembly to move axially by the screw, wherein a guide segment and a press-fit segment which are in communication with each other are disposed between an inner wall of the housing and an outer wall of the guide sleeve, the spacing between the guide sleeve and the housing located on the guide segment is greater than the spacing between the guide sleeve and the housing located on the press-fit segment, a welding ring groove is also disposed between the inner wall of the housing and the outer wall of the guide sleeve, and the welding ring groove is in communication with the guide segment.

In some embodiments, the housing includes a casing and a valve base, the guide sleeve is disposed in the valve base, and the guide segment and the press-fit segment are located between the guide sleeve and the valve base.

In some embodiments, the valve base is provided with a mounting hole, the guide sleeve is disposed in the mounting hole, the mounting hole has a first segment and a second segment which are connected with each other, an inner wall of the first segment is matched with the guide sleeve to form the guide segment, and an inner wall of the second segment is matched with the guide sleeve to form the press-fit segment.

In some embodiments, a mounting boss is disposed on the guide sleeve, the mounting boss is disposed along a circumferential direction of a side wall of the guide sleeve, and the guide segment and the press-fit segment are formed between a side wall of the mounting boss and an inner wall of the mounting hole.

In some embodiments, the mounting boss includes a third segment and a fourth segment, the third segment is disposed corresponding to the first segment, and the fourth segment is dispose corresponding to the second segment.

In some embodiments, the welding ring groove is disposed on the mounting boss, the welding ring groove is located between the third segment and the fourth segment, and the welding ring groove is disposed along a circumferential direction of the side wall of the mounting boss.

In some embodiments, a limiting boss is disposed in the mounting hole, the limiting boss is located on one side of the second segment away from the first segment, and the limiting boss is matched with the mounting boss to limit a displacement of the guide sleeve relative to the valve base.

In some embodiments, the electronic expansion valve further includes a nut assembly, the guide sleeve comprises a nut guide segment, and the nut assembly is disposed on the nut guide segment in a sleeving manner.

In some embodiments, the housing has an inlet hole and an outlet hole which are in communication with each other, the valve needle assembly is penetrated in the guide sleeve, and the valve needle assembly is configured to open or close the outlet hole; and the electronic expansion valve further includes: a first pipe, disposed in the inlet hole and partially extending into the housing; and a limiting structure, disposed between the guide sleeve and the first pipe, wherein the limiting structure is configured to limit a length of the first pipe extending into the housing.

In some embodiments, a limiting boss is disposed on the guide sleeve, and the limiting boss is disposed opposite to an end surface of the first pipe.

In some embodiments, the limiting boss is annularly disposed along a circumferential direction of the guide sleeve.

In some embodiments, the guide sleeve has a straight segment, the limiting boss is located above the straight segment, a cross-sectional dimension of the straight segment is less than a cross-sectional dimension of the limiting boss, and a spacing is formed between the straight segment and the end surface of the first pipe.

In some embodiments, a flow guide structure is disposed between the first pipe and the guide sleeve, and the flow guide structure is configured to circulate solder.

In some embodiments, a flow guide groove is disposed on an end surface of the first pipe extending into the housing.

In some embodiments, the housing includes a casing and a valve base which are connected with each other, the valve base includes a body and a mounting boss, the mounting boss is disposed at one end of the body away from the casing, and a valve port is disposed on the mounting boss; and the electronic expansion valve further includes: a second pipe sleeved on the mounting boss, wherein a welding ring containing part is formed between an inner wall of the second pipe and an outer side wall of the mounting boss, and the welding ring containing part is configured to place a welding ring.

In some embodiments, the welding ring containing part is disposed on the mounting boss.

In some embodiments, a containing groove is disposed on the outer side wall of the mounting boss, the containing groove is annularly disposed along a circumferential direction of the mounting boss, and the containing groove is configured to form the welding ring containing part.

In some embodiments, a flow guide structure is disposed between the second pipe and the mounting boss, and the flow guide structure is configured to circulate solder.

Some embodiment of the present invention further provides an assembling method of electronic expansion valve, applicable to the above electronic expansion valve, and the assembling method includes: putting a guide sleeve into a valve base, and making a fourth segment of the guide sleeve and a first segment of the valve base a clearance fit; press-fitting the guide sleeve, and making the fourth segment of the guide sleeve and a second segment of the valve base a tightly fit; assembling a first pipe and a second pipe on the valve base, and making the first pipe, the second pipe, the guide sleeve and the valve base welded together by means of integrated furnace welding.

In some embodiments, during press-fitting the guide sleeve, the assembling method also comprises: when a lower surface of a mounting boss being in contact with a step surface of a limiting boss, the guide sleeve is press-fitted.

Applying the technical solution of this disclosure, the electronic expansion valve includes a housing, a guide sleeve, a rotor, a screw and a valve needle assembly, wherein the guide sleeve is disposed in the housing, a guide segment and a press-fit segment which are in communication with each other are disposed between an inner wall of the housing and an outer wall of the guide sleeve, and a spacing between the guide sleeve and the housing located on the guide segment is greater than a spacing between the guide sleeve and the housing located on the press-fit segment. Since there is a gap between the guide sleeve and the housing located on the guide segment, a welding ring groove is also disposed between the inner wall of the housing and the outer wall of the guide sleeve, and the welding ring groove is in communication with the guide segment, the welding process requirements for furnace welding are met, and the guide sleeve, the first pipe and the second pipe can be welded to the housing by means of integrated furnace welding. With the above structure, since the guide sleeve is welded to the housing by means of integrated furnace welding, and the first pipe and the second pipe cannot affect the press-fitting of the guide sleeve, the coaxiality of the guide sleeve and the housing can be ensured.

BRIEF DESCRIPTION OF THE DRAWINGS

The drawings of the specification that constitute a part of this disclosure are used to provide a further understanding of this disclosure. The exemplary embodiments of this disclosure and the descriptions thereof are used to explain this disclosure, and do not constitute an improper limitation on this disclosure. In the drawings.

The above drawings include the following reference signs:

10. housing; 11. casing; 12. valve base; 121. mounting hole; 121a. first segment; 121b. second segment; 121c. limiting boss; 122. body; 123. mounting boss; 123a. containing groove; 20. guide sleeve; 21. mounting boss; 211. third segment; 212. fourth segment; 213. welding ring groove; 22. nut guide segment; 23. limiting boss; 24. straight segment; 30. nut assembly; 40. rotor; 50. screw; 60. valve needle assembly; 70. first pipe; 80. limiting structure; 90. second pipe; 100. welding ring containing part; 110. welding ring; 120. guide segment; 130. press-fit segment.

DETAILED DESCRIPTION OF THE EMBODIMENTS

Hereinafter, the technical solutions in the embodiments of this disclosure will be clearly and completely described below with reference to the accompanying drawings in the embodiments of this disclosure. It is apparent that the described embodiments are only part of the embodiments of this disclosure, and are not all of the embodiments. The following description of at least one exemplary embodiment is merely illustrative in nature and is not intended to limit this disclosure and uses thereof in any way. Based on the embodiments in this disclosure, all other embodiments obtained by those skilled in the art without inventive effort fall within the scope of protection of this disclosure.

As shown in FIGS. 1-8, Embodiment 1 of this disclosure provides an electronic expansion valve. The electronic expansion valve includes a housing 10, a guide sleeve 20, a rotor 40, a screw 50 and a valve needle assembly 60. The guide sleeve 20 and the screw 50 are both disposed in the housing 10. Specifically, the rotor 40 is rotatably disposed in the housing 10, and the rotor 40 is drivingly connected with the screw 50. The valve needle assembly 60 is movably disposed in the housing 10, and by connecting one end of the screw 50 with the valve needle assembly 60, the screw 50 can drive the valve needle assembly 60 to move axially, so that the valve needle assembly 60 is used to open or block a valve port. A guide segment 120 and a press-fit segment 130 which are in communication with each other are disposed between an inner wall of the housing 10 and an outer wall of the guide sleeve 20, and the spacing between the guide sleeve 20 and the housing 10 located on the guide segment 120 is greater than the spacing between the guide sleeve 20 and the housing 10 located on the press-fit segment 130. A welding ring groove 213 is also disposed between the inner wall of the housing 10 and the outer wall of the guide sleeve 20, and the welding ring groove 213 is in communication with the guide segment 120. The welding ring groove 213 is completely disposed in the guide segment 120, or the welding ring groove 213 is partially disposed in the guide segment 120 and partially disposed in the press-fit segment 130. In some embodiments, the welding ring groove 213 is partially disposed in the guide segment 120 and partially disposed in the press-fit segment 130, so that the solder can fully fill the gap, and the welding effect can be improved.

The spacing between the guide sleeve 20 and the housing 10 located on the guide segment 120 is greater than the spacing between the guide sleeve 20 and the housing 10 located on the press-fit segment 130, including the following three structures:

First structure: by expanding the inner diameter of a part of the inner wall of the housing 10, the guide segment 120 can be formed between the inner wall of the housing 10 and the outer wall of the guide sleeve 20, and by enabling another part of the inner wall of the housing 10 to be in interference fit with the outer wall of the guide sleeve 20, the press-fit segment 130 can be formed between the inner wall of the housing 10 and the outer wall of the guide sleeve 20;

Second structure: by reducing the outer diameter of a part of the outer wall of the guide sleeve 20, the guide segment 120 can be formed between the outer wall of the guide sleeve 20 and the inner wall of the housing 10, and by enabling the other part of the outer wall of the guide sleeve 20 to be interference fit with the inner wall of the housing 10, the press-fit segment 130 can be formed between the outer wall of the guide sleeve 20 and the inner wall of the housing 10; and Third structure: by simultaneously expanding the inner diameter of a part of the inner wall of the housing 10 and reducing the outer diameter of a part of the outer wall of the guide sleeve 20, the guide segment 120 can be formed between the inner wall of the housing 10 and the outer wall of the guide sleeve 20, and by enabling another part of the inner wall of the housing 10 to be interference fit with another part of the outer wall of the guide sleeve 20, the press-fit segment 130 can be formed between the inner wall of the housing 10 and the outer wall of the guide sleeve 20.

In some embodiments, the first structure is used to enable the spacing between the guide sleeve 20 and the housing 10 located on the guide segment 120 to be greater than the spacing between the guide sleeve 20 and the housing 10 located on the press-fit segment 130.

By applying the electronic expansion valve provided in the present embodiment, when a electronic expansion valve is assembled, the guide sleeve 20 and the housing 10 can be assembled first. When the guide sleeve 20 is press-fitted to the housing 10, the guide segment 120 can position and guide the guide sleeve 20, so that the guide sleeve 20 can be mounted in the housing 10, and the press-fit segment 130 can realize the press-fitting of the guide sleeve 20 and the housing 10. After the press-fitting is completed, the first pipe and the second pipe are respectively connected with the housing 10. Since there is a gap between the guide sleeve 20 and the housing 10 located on the guide segment 120, a welding ring groove 213 is disposed between the inner wall of the housing 10 and the outer wall of the guide sleeve 20, and the welding ring groove 213 is in communication with the guide segment 120, the welding process requirements for furnace welding are met, and the guide sleeve 20, the first pipe and the second pipe can be welded to the housing 10 by means of integrated furnace welding. With the above structure, since the guide sleeve 20 is welded to the housing 10 by means of furnace welding, and the first pipe and the second pipe cannot affect the press-fitting of the guide sleeve 20, the coaxiality of the guide sleeve 20 and the housing 10 can be ensured.

In some embodiments, due to complex technology and higher cost of laser welding, the first pipe, the second pipe and the guide sleeve 20 are welded to the housing 10 by means of integrated furnace welding, which can simplify the processing technology and reduce the processing cost. In some embodiments, in the art known to inventors, when the guide sleeve 20 is welded to the housing 10 by means of laser welding, since there is a plurality of welding points between the guide sleeve 20 and the housing 10, the welding process cannot ensure the coaxiality of the guide sleeve 20 and the housing 10. In the present embodiment, the guide sleeve 20 is welded to the housing 10 by means of furnace welding, and the welding process can not affect the coaxiality of the guide sleeve 20 and the housing 10, so that the accuracy of the device can be improved, and the sealing performance of the electronic expansion valve can be improved.

In some embodiments, the housing 10 includes a casing 11 and a valve base 12, the guide sleeve 20 is disposed in the valve base 12, and the guide segment 120 and the press-fit segment 130 are located between the guide sleeve 20 and the valve base 12. The first pipe and the second pipe are both connected with the valve base 12.

Figure 2:
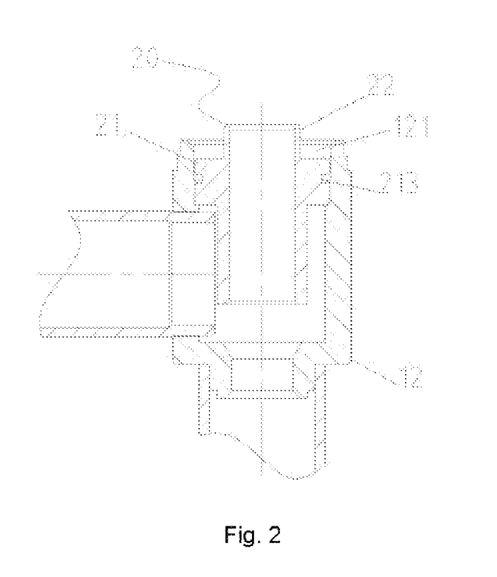
FIG. 2 illustrates a cross-sectional diagram after press-fitting of a valve base and a guide sleeve in FIG. 1.
Figure 3:
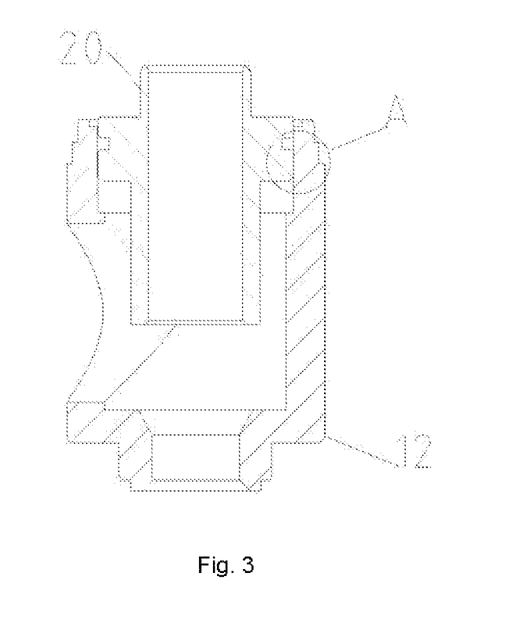
FIG. 3 illustrates a schematic diagram of guiding the guide sleeve by a guide segment when the guide sleeve is put into the valve base in FIG. 1.
Figure 4:
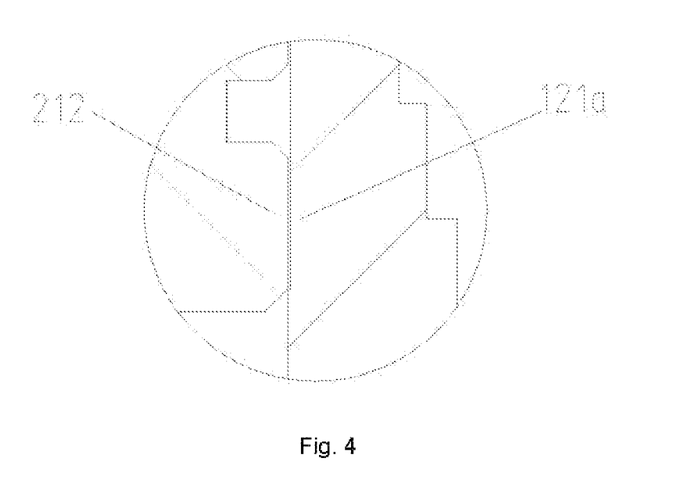
FIG. 4 illustrates a partially enlarged diagram of A in FIG. 3.
Figure 5:
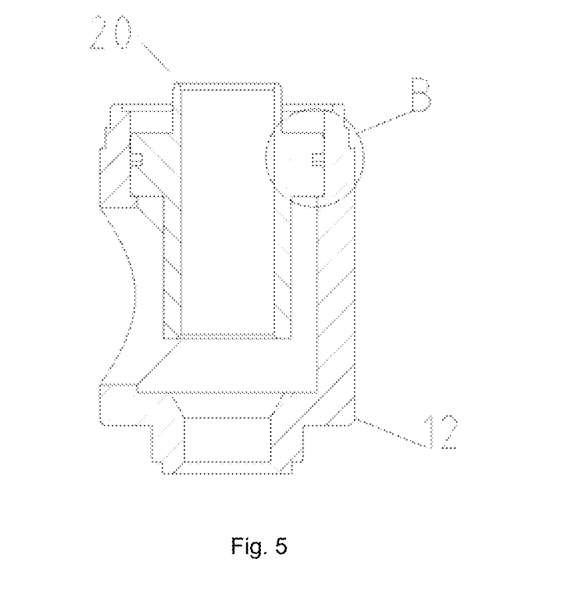
FIG. 5 illustrates a schematic diagram after the guide sleeve is press-fitted to the press-fit segment in FIG. 1.
Figure 6:
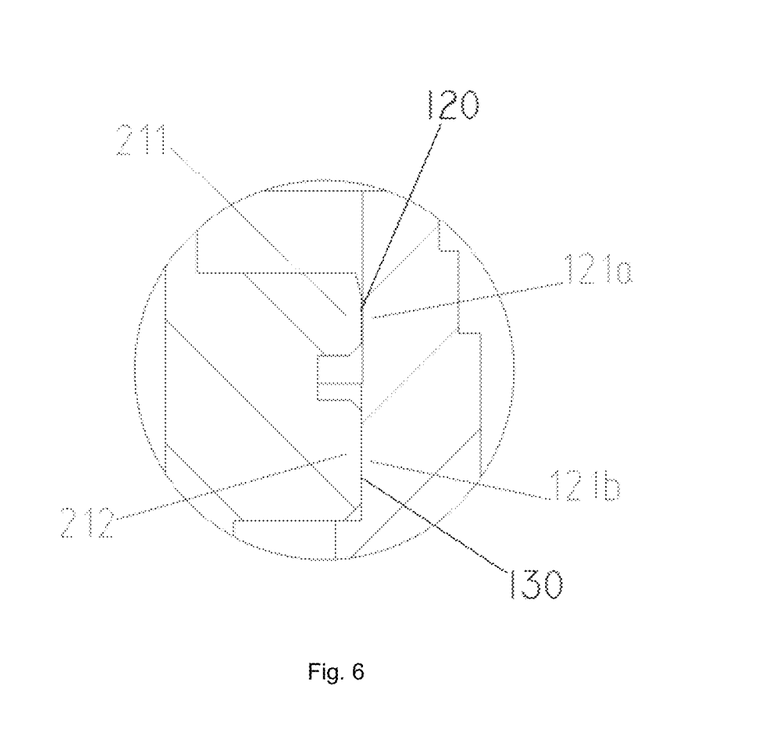
FIG. 6 illustrates a partially enlarged diagram of B in FIG. 5.
Figure 8:
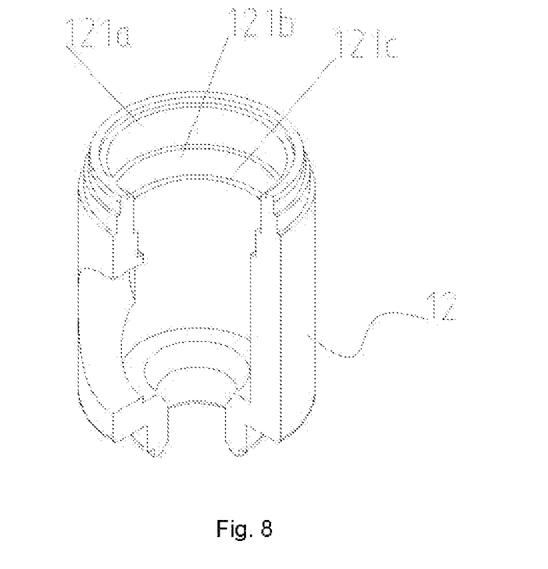
FIG. 8 illustrates a schematic structural diagram of the valve base in FIG. 1.

The valve base 12 is provided with a mounting hole 121, the guide sleeve 20 is disposed in the mounting hole 121, and the mounting hole 121 has a first segment 121a and a second segment 121b which are connected with each other. In the present embodiment, an inner wall of the first segment 121a is matched with the guide sleeve 20 to form the guide segment 120, an inner wall of the second segment 121b is matched with the guide sleeve 20 to form the press-fit segment 130, and the first segment 121a is located above the second segment 121b. In other embodiments, the first segment 121a is located below the second segment 121b.

In some embodiments, the aperture of the first segment 121a is greater than the aperture of the second segment 121b, so that the spacing between the guide sleeve 20 and the housing 10 located on the guide segment 120 is greater than the spacing between the guide sleeve 20 and the housing 10 located on the press-fit segment 130. In some embodiments, the aperture of the first segment 121a is greater than the aperture of the second segment 121b by 0.02 mm to 0.08 mm. With the above structure, the spacing between the guide sleeve 20 and the first segment 121a is 0.01 mm to 0.04 mm, and the guide sleeve 20 and the second segment 121b are interference fit.

Figure 7:
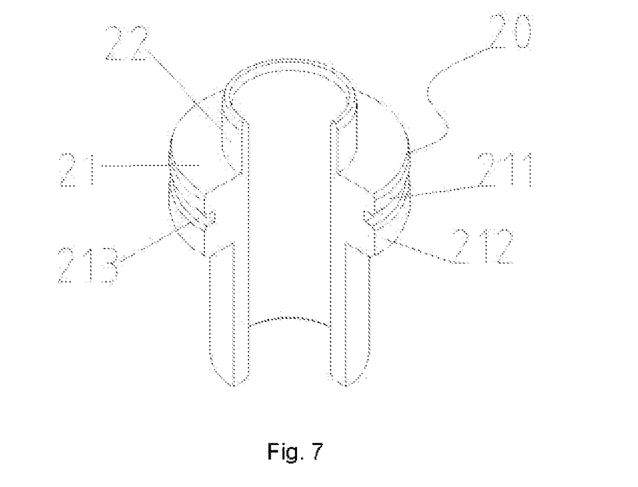
FIG. 7 illustrates a schematic structural diagram of the guide sleeve in FIG. 1.

A mounting boss 21 is disposed on the guide sleeve 20, the mounting boss 21 is disposed along a circumferential direction of a side wall of the guide sleeve 20, and the guide segment 120 and the press-fit segment 130 are formed between a side wall of the mounting boss 21 and the inner wall of the mounting hole 121. In some embodiments, the guide segment 120 and the press-fit segment 130 are formed between the side wall of the mounting boss 21 and the inner walls of the first segment 121a and the second segment 121b of the mounting hole 121.

In some embodiments, the mounting boss 21 includes a third segment 211 and a fourth segment 212, the third segment 211 is disposed corresponding to the first segment 121a, and the fourth segment 212 is disposed corresponding to the second segment 121b. The third segment 211 is located above the fourth segment 212.

In some embodiments, the cross-sectional dimension of the third segment 211 is equal to the cross-sectional dimension of the fourth segment 212.

In some embodiments, the welding ring groove 213 is disposed on the mounting boss 21, the welding ring groove 213 is located between the third segment 211 and the fourth segment 212, and the welding ring groove 213 is disposed along a circumferential direction of the side wall of the mounting boss 21. In some embodiments, one end of the welding ring groove 213 is connected with the third segment 211, and the other end of the welding ring groove 213 is connected with the fourth segment 212. With the above structure, the welding ring groove 213 can be used to place a welding ring, so as to complete the connection between the guide sleeve 20 and the housing 10 by means of furnace welding.

A limiting boss 121c is disposed in the mounting hole 121, and the limiting boss 121c is located on one side of the second segment 121b away from the first segment 121a. In some embodiments, one end of the limiting boss 121c is connected with the second segment 121b. By matching the limiting boss 121c with the mounting boss 21, the displacement of the guide sleeve 20 relative to the valve base 12 can be limited, so as to prevent the guide sleeve 20 from going too deep into the mounting hole 121.

Figure 1:
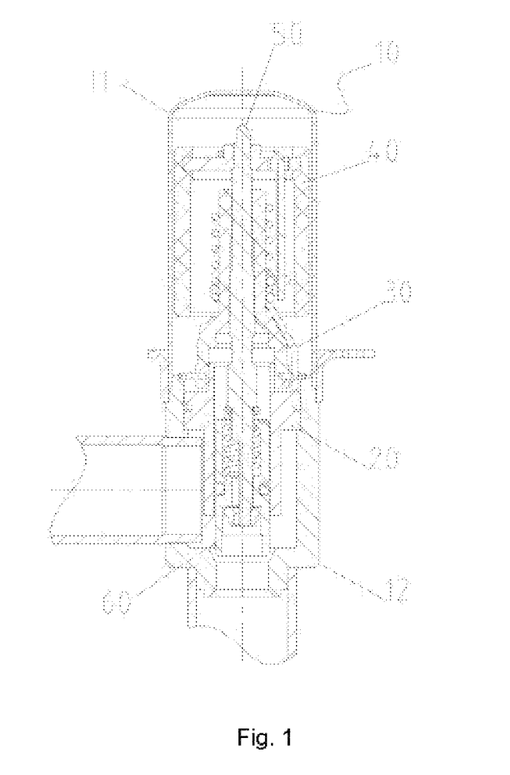
FIG. 1 illustrates a schematic structural diagram of an electronic expansion valve according to Embodiment 1 of this disclosure.

In some embodiments, the electronic expansion valve further includes a nut assembly 30, the guide sleeve 20 includes a nut guide segment 22, and the nut assembly 30 is disposed on the nut guide segment 22 in a sleeving manner. In some embodiments, the nut guide segment 22 is connected with the mounting boss 21 and located above the mounting boss 21. After the welding of the guide sleeve 20 and the housing 10, the nut assembly 30 can be press-fitted to the nut guide segment 22 of the guide sleeve 20. During the press-fitting process, the nut guide segment 22 can position and guide the nut assembly 30.

The assembling steps of the electronic expansion valve provided in the Embodiment 1 are:
(1) the guide sleeve 20 is put into the valve base 12, and the fourth segment 212 of the guide sleeve 20 is in clearance fit with the first segment 121a of the valve base 12, so as to position and guide the guide sleeve 20;
(2) the guide sleeve 20 is press-fitted so that a lower surface of the mounting boss 21 is in contact with a step surface of the limiting boss 121c, and the fourth segment 212 of the guide sleeve 20 is tightly fitted with the second segment 121b of the valve base 12. At this time, there is a gap of 0.01 mm to 0.04 mm on one side between the third segment 211 of the guide sleeve 20 and the first segment 121a of the valve base 12 as a welding seam, and a welding ring is placed in the welding ring groove 213; and
(3) the first pipe and the second pipe are assembled on the valve base 12, and the first pipe, the second pipe, the guide sleeve 20 and the valve base 12 are welded together by means of integrated furnace welding.

Figure 9:
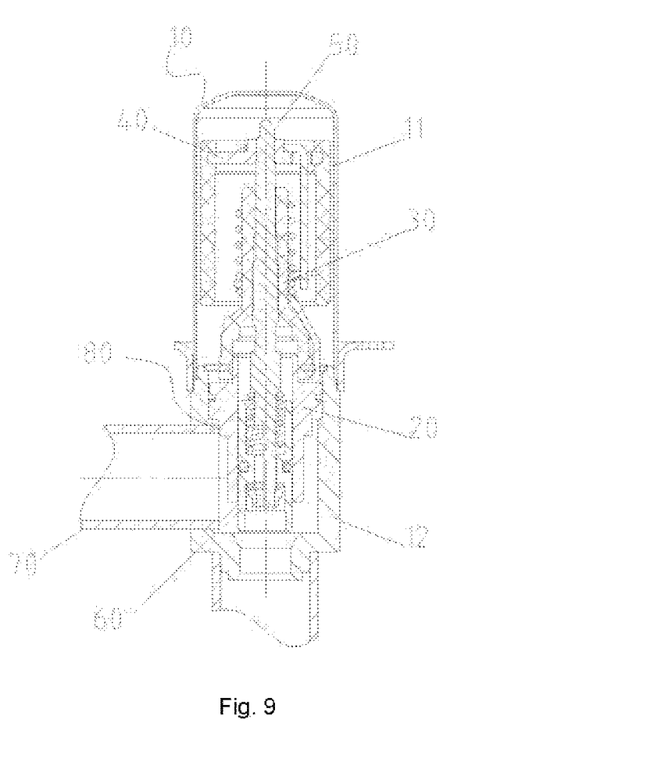
FIG. 9 illustrates a schematic structural diagram of an electronic expansion valve according to Embodiment 2.
Figure 10:
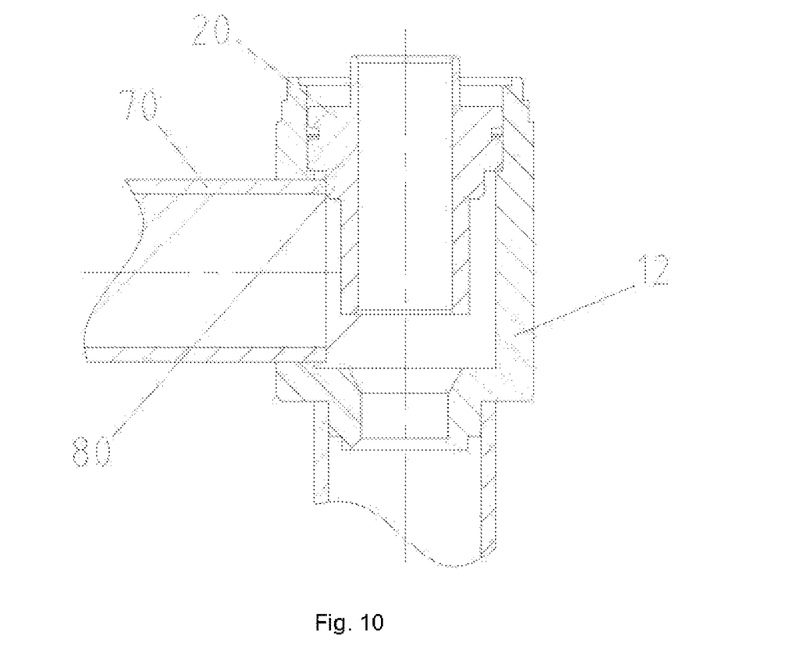
FIG. 10 illustrates an assembly diagram of a first pipe and a valve base in FIG. 9.
Figure 11:
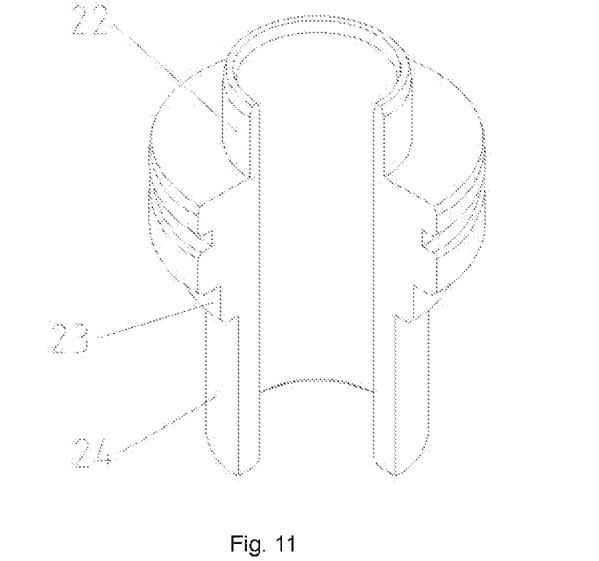
FIG. 11 illustrates a schematic structural diagram of a guide sleeve in FIG. 9.

As shown in FIGS. 9-11, Embodiment 2 of this disclosure provides an electronic expansion valve. Compared with the Embodiment 1, the electronic expansion valve provided in Embodiment 2 is different in that: in the present embodiment, the cross-sectional dimension of the third segment 211 is less than or greater than the cross-sectional dimension of the fourth segment 212. In some embodiments, the cross-sectional dimension of the third segment 211 is less than the cross-sectional dimension of the fourth segment 212, the guide segment 120 is formed between the third segment 211 and the inner wall of the mounting hole 121, and the press-fit segment 130 is formed between the fourth segment 212 and the inner wall of the mounting hole 121, so that the spacing between the guide sleeve 20 and the housing 10 located on the guide segment 120 is greater than the spacing between the guide sleeve 20 and the housing 10 located on the press-fit segment 130. In the present embodiment, the third segment 211 is located above the fourth segment 212. In other embodiments, the third segment 211 is located below the fourth segment 212.

In some embodiments, the cross-sectional dimension of the third segment 211 is less than the cross-sectional dimension of the fourth segment 212 by 0.02 mm to 0.08 mm. With the above structure, the spacing between the inner wall of the mounting hole 121 and the third segment 211 is 0.01 mm to 0.04 mm, and the inner wall of the mounting hole 121 and the fourth segment 212 are interference fit. The apertures of the first segment 121a and the second segment 121b of the mounting hole 121 are equal.

As shown in FIGS. 12-17, Embodiment 3 of this disclosure provides an electronic expansion valve. Compared with the Embodiment 1, the electronic expansion valve provided in Embodiment 3 is different in that: in this embodiment, the aperture of the first segment 121a is greater than the aperture of the second segment 121b, the cross-sectional dimension of the third segment 211 is less than the cross-sectional dimension of the fourth segment 212, the guide segment 120 is formed between the inner wall of the first segment 121a and the outer wall of the third segment 211, and the press-fit segment 130 is formed between the inner wall of the second segment 121b and the outer wall of the fourth segment, so that the spacing between the guide sleeve 20 and the housing 10 located on the guide segment 120 is greater than the spacing between the guide sleeve 20 and the housing 10 located on the press-fit segment 130. In the present embodiment, the first segment 121a is located above the second segment 121b, and the third segment 211 is located above the fourth segment 212. In other embodiments, the first segment 121a is disposed below the second segment 121b, and the third segment 211 is disposed below the fourth segment 212.

The electronic expansion valve provided in the above embodiment has the following beneficial effects:
(1) when the guide sleeve 20 and the housing 10 are press-fitted, the guide sleeve 20 can be positioned by the guide segment 120, so that the press-fitting process is convenient;
(2) after the guide sleeve 20 is press-fitted into the housing 10, the first pipe and the second pipe are assembled on the housing 10, and the housing 10 assembled with the first pipe, the second pipe and the guide sleeve 20 is welded by means of integrated furnace welding, so that the process is simple and stable, and the coaxiality of the guide sleeve and the valve body can be effectively ensured;
(3) after the integrated furnace welding, the welding quality can be observed through the guide segment 120, and if there is solder seepage, it means that the welding seam is filled, and the welding method is judged to be reliable and efficient; and
(4) due to the manner of furnace welding, both the valve base 12 and the guide sleeve 20 is made of sus303, which can reduce the trial production difficulty and cost of the valve base 12 and the guide sleeve 20. In the art known to inventors, since the valve base 12 and the guide sleeve 20 are welded by means of laser welding, a stainless-steel material with higher strength needs to be used, and the cost is higher.

In the art known to inventors, an electronic expansion valve includes a housing, a first pipe and a second pipe, the housing is provided with an inlet hole and an outlet hole which are in communication with each other, the first pipe is arranged in the inlet hole and partially extends into the housing, a coolant can enter the housing from the inlet hole through the first pipe, and the second pipe is disposed corresponding to the outlet hole. In order to limit the length of the first pipe extending into the housing, a necked segment is arranged at one end of the first pipe close to the inlet hole, and by controlling the length of the necked segment, the length of the first pipe extending into the housing can be limited. However, in the art known to inventors, the length of the necked segment is difficult to ensure, and thus, the length of the first pipe extending into the housing cannot be accurately controlled. Furthermore, the necking of the first pipe will increase the flow resistance of the first pipe, which affects the use of the electronic expansion valve. Therefore, there is a problem that the art known to inventors cannot meet the use requirements.

In order to solve the above problem, in another embodiment, different from the above embodiment, the housing 10 has an inlet hole and an outlet hole which are in communication with each other, the valve needle assembly 60 is penetrated in the guide sleeve 20, and the valve needle assembly 60 is configured to open or close the outlet hole. The electronic expansion valve further includes a first pipe 70 and a limiting structure 80. The first pipe 70 disposed in the inlet hole and partially extending into the housing 10. the limiting structure 80 is disposed between the guide sleeve 20 and the first pipe 70, wherein the limiting structure 80 is configured to limit the length of the first pipe 70 extending into the housing 10, so as to prevent the first pipe 70 from extending into the housing 10 excessively. The limiting structure 80 is disposed on the guide sleeve 20, or disposed on the first pipe 70, or simultaneously disposed on the guide sleeve 20 and the first pipe 70.

Applying the electronic expansion valve provided in the present embodiment, by arranging the limiting structure 80 between the guide sleeve 20 and the first pipe 70, the limiting structure 80 can be used to limit the length of the first pipe 70 extending into the housing 10. In this way, the length of the first pipe 70 extending into the housing 10 can be accurately controlled by the limiting structure 80 without necking the first pipe 70, and the flow resistance of the first pipe 70 cannot be increased, so that the use requirements can be met. Furthermore, since the first pipe 70 does not need to be necked, the processing cost can be reduced.

In some embodiments, a limiting boss 23 is disposed on the guide sleeve 20, the limiting boss 23 is disposed opposite to an end surface of the first pipe 70, and the limiting boss 23 forms the limiting structure 80. When the length of the first pipe 70 extending into the housing 10 reaches a preset dimension, the end surface of the first pipe 70 will abut against the limiting boss 23, so that the limiting boss 23 can be used to restrict the continuous movement of the first pipe 70 relative to the housing 10. In other embodiments, a limiting boss is disposed on the end surface of the first pipe 70, and the limiting boss is higher than the end surface of the first pipe 70, which can also play a limiting role.

In some embodiments, the limiting boss 23 is annularly disposed along the circumferential direction of the guide sleeve 20. With the above structure, the turning amount of the guide sleeve 20 can be reduced, the processing efficiency can be improved, the service life of a cutter can be prolonged, and the cost can be reduced.

In order to prevent the limiting boss 23 from blocking the flow of the coolant, the limiting boss 23 is located above the axis of the first pipe 70. In some embodiments, a lower end surface of the limiting boss 23 is located above the axis of the first pipe 70. In the present embodiment, the lower end surface of the limiting boss 23 is flush with the inner wall of the first pipe 70, so that the first pipe 70 can be limited by the limiting boss 23, and the flow capacity of the coolant can be ensured to the maximum extent at the same time.

In some embodiments, the guide sleeve 20 has a straight segment 24, the limiting boss 23 is located above the straight segment 24, and a cross-sectional dimension of the straight segment 24 is less than a cross-sectional dimension of the limiting boss 23. In some embodiments, there is a spacing between the straight segment 24 and the end surface of the first pipe 70, so that the resistance of the coolant entering the first pipe 70 formed by the guide sleeve 20 can be reduced, and the flow capacity is stronger.

In order for the solder to smoothly flow between the first pipe 70 and the guide sleeve 20, a flow guide structure is disposed between the first pipe 70 and the guide sleeve 20, and the flow guide structure is configured to circulate the solder, so that the welding effect can be improved, and it is convenient to detect the welding quality.

In some embodiments, a flow guide groove is disposed on an end surface of the first pipe 70 extending into the housing 10, and the flow guide groove forms the flow guide structure. Embossing may also be disposed on the end surface of the first pipe 70, and the flow of the solder is guided by the embossing.

In some embodiments, since in the art known to inventors, the first pipe is provided with a necked structure, when the first pipe and the housing 10 are welded, the flow of the solder can only be observed on the outside of the first pipe, and the welding effect cannot be accurately judged. In the present embodiment, since the first pipe 70 is a straight pipe, the flow of the solder can be observed on the outside of the first pipe 70 and at a pipe orifice of the first pipe 70 at the same time, the welding effect can be accurately judged, and the welding quality can be improved.

In some embodiments, the housing 10 includes a casing 11 and a valve base 12, the guide sleeve 20 is arranged in the valve base 12, the inlet hole is disposed on the side wall of the valve base 12, and the first pipe 70 is penetrated on the valve base 12. The outlet hole is also disposed on the valve base 12.

In some embodiments, the outlet hole is arranged corresponding to the valve port.

In some embodiments, the first pipe 70 and the housing 10 is welded by means of integrated furnace welding.

The electronic expansion valve provided in this embodiment has the following beneficial effects:
(1) by arranging the limiting boss 23 on the guide sleeve 20, the limiting boss 23 can be used to limit the length of the first pipe 70 extending into the housing 10, and the first pipe 70 does not need to be necked, so that the cost can be reduced;
(2) since the first pipe 70 does not need to be necked, the flow resistance can be reduced, and the flow capacity can be improved;
(3) the turning amount of the guide sleeve 20 is relatively small, the processing efficiency can be improved, the service life of a cutter can be prolonged, and the cost can be reduced;
(4) there is a diameter difference between the limiting boss 23 and the straight segment 24 of the guide sleeve 20, so that the resistance of the guide sleeve 20 to the coolant entering the first pipe 70 can be reduced, and the flow capacity can be further improved; and
(5) the flow of the solder can be observed on the outside of the first pipe 70 and at a pipe orifice of the first pipe 70 at the same time, so that the welding effect can be accurately judged, and the welding quality can be improved.

In the art known to inventors, in order to connect the second pipe with the housing, first, the second pipe is sleeved on the mounting boss, then, a welding ring is sleeved on the outside of the second pipe, and the connection is completed by means of welding. During welding, the welding quality can be detected through a pipe orifice of the second pipe away from a welding end. However, in the art known to inventors, it is difficult for an employee to accurately judge the welding quality of the welding end from the pipe orifice away from the welding end. Furthermore, when the second pipe is a bent pipe, the employee cannot detect the welding quality. Therefore, the art known to inventors has the problem that it is difficult to detect the welding quality.

Figure 12:
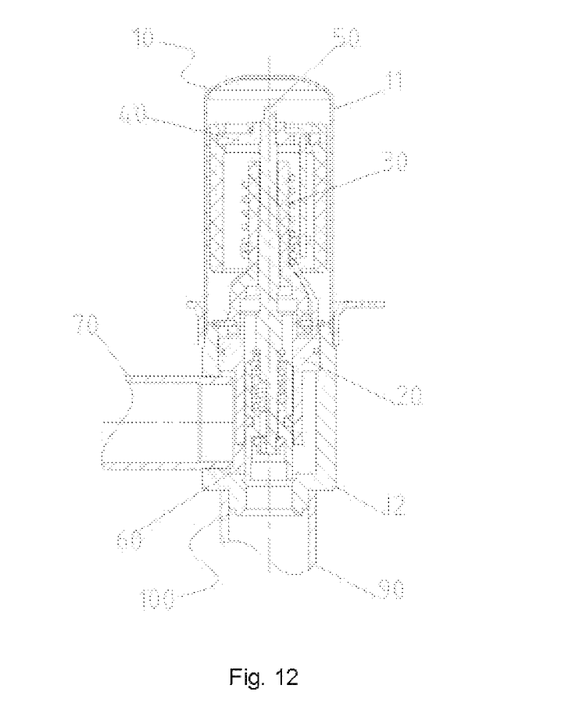
FIG. 12 illustrates a schematic structural diagram of an electronic expansion valve according to Embodiment 3.
Figure 13:
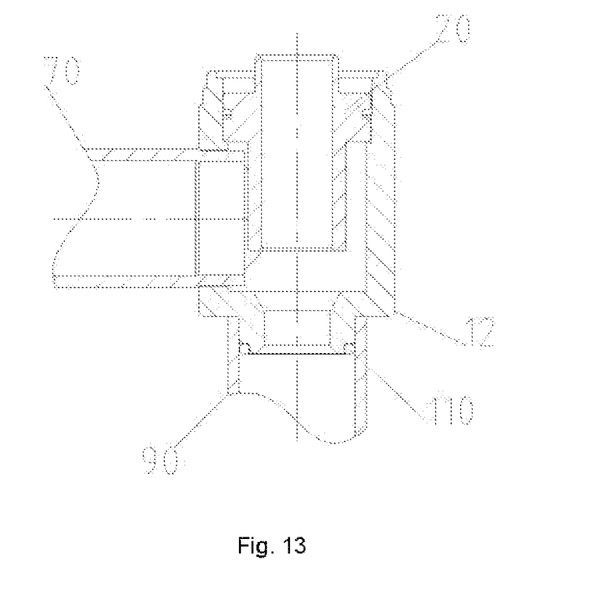
FIG. 13 illustrates a cross-sectional diagram of a second pipe and a valve base in FIG. 12.
Figure 14:
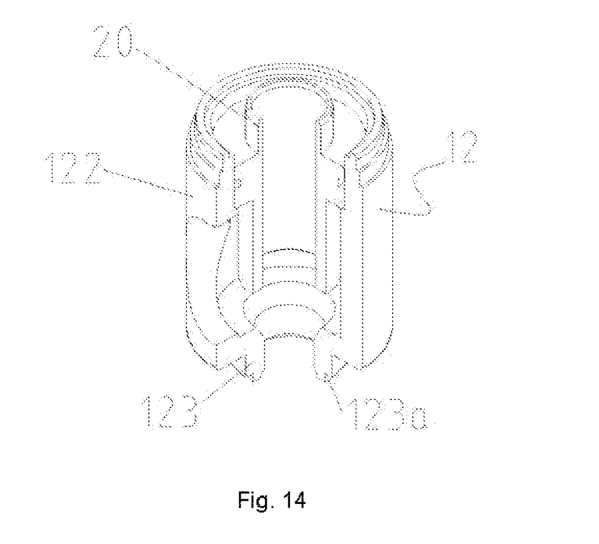
FIG. 14 illustrates an assembly diagram of a guide sleeve and the valve base in FIG. 12.
Figure 15:
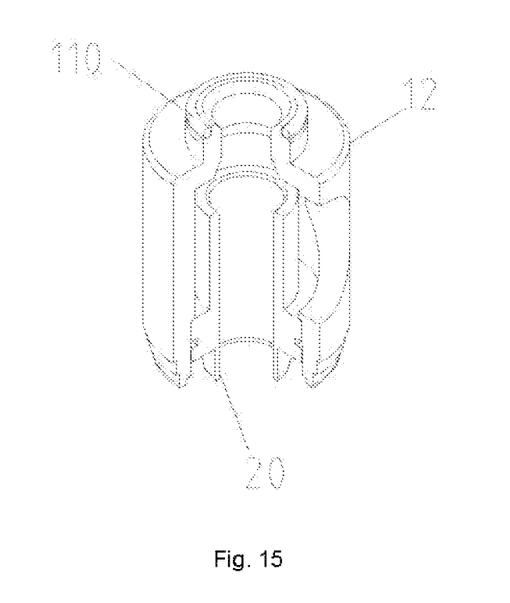
FIG. 15 illustrates another assembly diagram of the guide sleeve and the valve base in FIG. 12.
Figure 16:
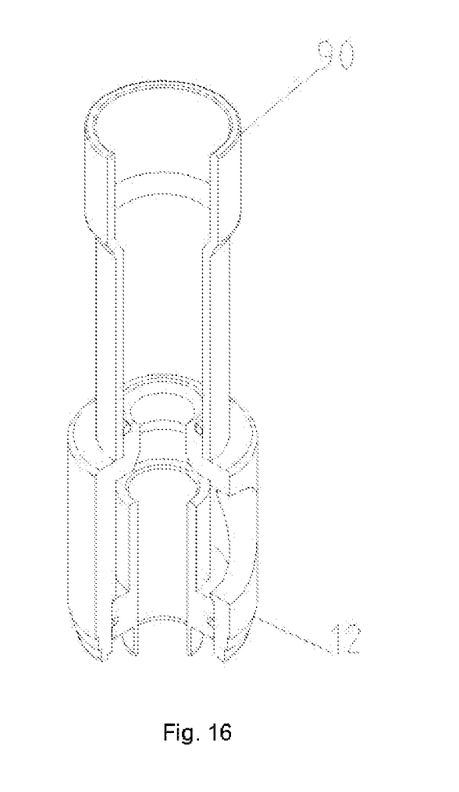
FIG. 16 illustrates an assembly diagram of the second pipe and the valve base in FIG. 12.
Figure 17:
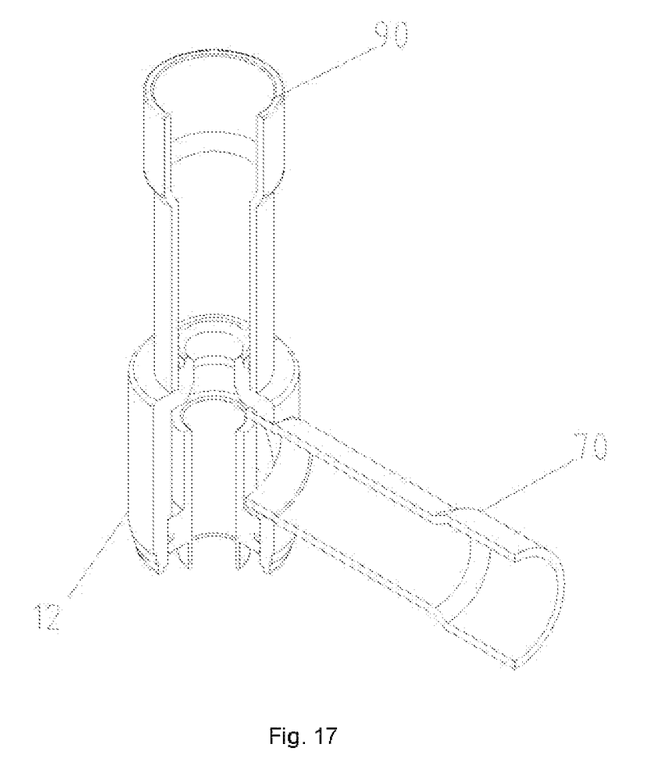
FIG. 17 illustrates an assembly diagram of a first pipe and the valve base in FIG. 12.

In order to solve the above problem, in another embodiment, different from the Embodiment 1, the housing 10 includes a casing 11 and a valve base 12 which are connected with each other, the valve base 12 includes a body 122 and a mounting boss 123, the mounting boss 123 is disposed at one end of the body 122 away from the casing 11, and the mounting boss 123 is provided with a valve port. The electronic expansion valve further includes: a second pipe 90 which sleeved on the mounting boss 123. A welding ring containing part 100 is formed between an inner wall of the second pipe 90 and an outer side wall of the mounting boss 123, and the welding ring containing part 100 is configured to place a welding ring 110. The welding ring containing part 100 is disposed on the inner wall of the second pipe 90, or disposed on the outer side wall of the mounting boss 123, or simultaneously disposed on the inner wall of the second pipe 90 and the outer side wall of the mounting boss 123.

Applying the electronic expansion valve provided in the present embodiment, since the welding ring 110 is arranged inside the second pipe 90, when the second pipe 90 is welded, by observing from the outside of the second pipe 90 whether there is solder leaking from the space between the second pipe 90 and the valve base 12, the welding quality can be accurately judged and can be detected by the employee conveniently. Furthermore, the judgment of the welding quality is not limited by a pipe shape of the second pipe 90, and a bent pipe can be judged. Since less solder is stacked on the outside of the second pipe 90 after welding, the positioning and press-fitting of the electronic expansion valve can be effectively ensured.

In some embodiments, the welding ring containing part 100 is disposed on the mounting boss 123. The welding ring containing part 100 is disposed in the middle of the mounting boss 123, or disposed at two ends of the mounting boss 123. By disposing the welding ring containing part 100 on the mounting boss 123, the welding ring containing part 100 can be processed conveniently, and the processing cost can be reduced.

In some embodiments, a containing groove 123a is disposed on the outer side wall of the mounting boss 123, the containing groove 123a is annularly disposed along the circumferential direction of the mounting boss 123, and the containing groove 123a is configured to form the welding ring containing part 100. The containing groove 123a is disposed in the middle of the mounting boss 123, or disposed at two ends of the mounting boss 123. Moreover, by arranging the containing groove 123a, the processing is convenient.

In some embodiments, the containing groove 123a is located at one end of the mounting boss 123 away from the body 122. With the above structure, only one end of the mounting boss 123 away from the body 122 needs to be turned to form the containing groove 123a, so that the processing cost can be further reduced, and the welding ring 110 can be placed conveniently.

In order for the solder to smoothly flow between the second pipe 90 and the mounting boss 123, a flow guide structure is disposed between the second pipe 90 and the mounting boss 123, and the flow guide structure is configured to circulate the solder, so that the welding effect can be improved, and it is convenient to detect the welding quality.

In some embodiments, a flow guide groove is disposed on the inner wall of the second pipe 90, and the flow guide groove forms the flow guide structure. Embossing may also be disposed on the end surface of the second pipe 90, and the flow of the solder is guided by the embossing.

The electronic expansion valve provided in this embodiment has the following beneficial effects:
(1) after the welding of the second pipe 90 and the housing 10 is completed, the connecting part between the second pipe 90 and the valve base 12 can be observed from the outside of the second pipe 90, and if there is solder in this region, it means that the welding of the second pipe 90 and the valve base 12 has been completed through the solder;
(2) the judgment of the welding quality is not affected by a shape of the second pipe 90, and a bent pipe can be judged;
(3) after the welding of the second pipe 90 and the housing 10, less solder is stacked on the outer wall of the second pipe 90 connected with the valve base 12, so that subsequent positioning and press-fitting of the device can be effectively ensured; and (4) since the amount of the stacked solder is reduced, the usage amount of the solder can be reduced, and the cost can be reduced.

Embodiment 1 of this invention provides an assembling method of electronic expansion valve, applicable to the above electronic expansion valve, and the assembling method includes: putting a guide sleeve 20 into a valve base 12, and making a fourth segment 212 of the guide sleeve 20 and a first segment 121*a* of the valve base 12 a clearance fit;

press-fitting the guide sleeve 20, and making the fourth segment 212 of the guide sleeve 20 and a second segment 121*b* of the valve base 12 a tightly fit; and assembling a first pipe and a second pipe on the valve base 12, and making the first pipe, the second pipe, the guide sleeve 20 and the valve base 12 welded together by means of integrated furnace welding.

In some embodiments, during press-fitting the guide sleeve 20, wherein the assembling method also comprises: when a lower surface of a mounting boss 21 being in contact with a step surface of a limiting boss 121*c*, the guide sleeve 20 is press-fitted.

The above embodiments are merely some embodiments of this disclosure and are not intended to limit this disclosure. It will be apparent to those skilled in the art that various modifications and changes may be made in this disclosure. Any modification, equivalent replacement and improvement made within the spirit and principle of this disclosure shall be included in the protection scope of this disclosure.

What is claimed is:

1. An electronic expansion valve, wherein the electronic expansion valve comprises:
   a housing;
   a guide sleeve, disposed in the housing;
   a rotor, rotatably disposed in the housing;
   a screw, disposed in the housing, the rotor being drivingly connected with the screw; and
   a valve needle assembly, movably disposed in the housing, one end of the screw being connected with the valve needle assembly so as to drive the valve needle assembly to move axially by the screw,
   wherein a guide segment and a press-fit segment which are in communication with each other are disposed between an inner wall of the housing and an outer wall of the guide sleeve, a spacing between the guide sleeve and the housing located on the guide segment is greater than a spacing between the guide sleeve and the housing located on the press-fit segment, a welding ring groove is disposed between the inner wall of the housing and the outer wall of the guide sleeve, and the welding ring groove is in communication with the guide segment.

2. The electronic expansion valve as claimed in claim 1, wherein the housing comprises a casing and a valve base, the guide sleeve is disposed in the valve base, and the guide segment and the press-fit segment are located between the guide sleeve and the valve base.

3. The electronic expansion valve as claimed in claim 2, wherein the valve base is provided with a mounting hole, the guide sleeve is disposed in the mounting hole, the mounting hole has a first segment and a second segment which are connected with each other, an inner wall of the first segment is matched with the guide sleeve to form the guide segment, and an inner wall of the second segment is matched with the guide sleeve to form the press-fit segment.

4. The electronic expansion valve as claimed in claim 3, wherein a mounting boss is disposed on the guide sleeve, the mounting boss is disposed along a circumferential direction of a side wall of the guide sleeve, and the guide segment and the press-fit segment are formed between a side wall of the mounting boss and an inner wall of the mounting hole.

5. The electronic expansion valve as claimed in claim 4, wherein the mounting boss comprises a third segment and a fourth segment is disposed corresponding to the first segment, and the fourth segment is disposed corresponding to the second segment.

6. The electronic expansion valve as claimed in claim 5, wherein the welding ring groove is disposed on the mounting boss, the welding ring groove is located between the third segment and the fourth segment, and the welding ring groove is disposed along a circumferential direction of the side wall of the mounting boss.

7. The electronic expansion valve as claimed in claim 4, wherein a limiting boss is disposed in the mounting hole, the limiting boss is located on one side of the second segment away from the first segment, and the limiting boss is matched with the mounting boss to limit a displacement of the guide sleeve relative to the valve base.

8. The electronic expansion valve as claimed in claim 1, wherein the electronic expansion valve further comprises a nut assembly, the guide sleeve comprises a nut guide segment, and the nut assembly is disposed on the nut guide segment in a sleeving manner.

9. The electronic expansion valve as claimed in claim 1, wherein the housing has an inlet hole and an outlet hole which are in communication with each other, the valve needle assembly is penetrated in the guide sleeve, and the valve needle assembly is configured to open or close the outlet hole; and the electronic expansion valve further comprises:
   a first pipe, disposed in the inlet hole and partially extending into the housing; and
   a limiting structure, disposed between the guide sleeve and the first pipe, wherein the limiting structure is configured to limit a length of the first pipe extending into the housing.

10. The electronic expansion valve as claimed in claim 9, wherein a limiting boss is disposed on the guide sleeve, and the limiting boss is disposed opposite to an end surface of the first pipe.

11. The electronic expansion valve as claimed in claim 10, wherein the limiting boss is annularly disposed along a circumferential direction of the guide sleeve.

12. The electronic expansion valve as claimed in claim 10, wherein the guide sleeve has a straight segment, the limiting boss is located above the straight segment, a cross-sectional dimension of the straight segment is less than a cross-sectional dimension of the limiting boss, and a spacing is formed between the straight segment and the end surface of the first pipe.

13. The electronic expansion valve as claimed in claim 9, wherein a flow guide structure is disposed between the first pipe and the guide sleeve, and the flow guide structure is configured to circulate solder.

14. The electronic expansion valve as claimed in claim 13, wherein a flow guide groove is disposed on an end surface of the first pipe extending into the housing.

15. The electronic expansion valve as claimed in claim 1, wherein the housing comprises a casing and a valve base which are connected with each other, the valve base comprises a body and a mounting boss, the mounting boss is disposed at one end of the body away from the casing, and a valve port is disposed on the mounting boss; and the electronic expansion valve further comprises:

a second pipe, sleeved on the mounting boss, wherein a welding ring containing part is formed between an inner wall of the second pipe and an outer side wall of the mounting boss, and the welding ring containing part is configured to place a welding ring.

16. The electronic expansion valve as claimed in claim 15, wherein the welding ring containing part is disposed on the mounting boss.

17. The electronic expansion valve as claimed in claim 16, wherein a containing groove is disposed on the outer side wall of the mounting boss, the containing groove is annularly disposed along a circumferential direction of the mounting boss, and the containing groove is configured to form the welding ring containing part.

18. The electronic expansion valve as claimed in claim 15, wherein a flow guide structure is disposed between the second pipe and the mounting boss, and the flow guide structure is configured to circulate solder.

19. An assembling method of electronic expansion valve, applicable to the electronic expansion valve as claimed in claim 1, wherein the assembling method comprises:
putting a guide sleeve into a valve base, and making a fourth segment of the guide sleeve and a first segment of the valve base a clearance fit;
press-fitting the guide sleeve, and making the fourth segment of the guide sleeve a second segment of the valve base a tightly fit; and
assembling a first pipe and a second pipe on the valve base, and making the first pipe, the second pipe, the guide sleeve and the valve base welded together by means of integrated furnace welding.

20. The assembling method as claimed in claim 19, during press-fitting the guide sleeve, wherein the assembling method also comprises:
when a lower surface of a mounting boss being in contact with a step surface of a limiting boss, the guide sleeve is press-fitted.

* * * * *